(12) United States Patent
Miyachi

(10) Patent No.: US 8,189,151 B2
(45) Date of Patent: *May 29, 2012

(54) LIQUID CRYSTAL DISPLAY DEVICE

(75) Inventor: Koichi Miyachi, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 897 days.

This patent is subject to a terminal disclaimer.

(21) Appl. No.: 11/919,795

(22) PCT Filed: May 15, 2006

(86) PCT No.: PCT/JP2006/310077
§ 371 (c)(1),
(2), (4) Date: Nov. 2, 2007

(87) PCT Pub. No.: WO2006/121220
PCT Pub. Date: Nov. 16, 2006

(65) Prior Publication Data
US 2009/0079923 A1    Mar. 26, 2009

(30) Foreign Application Priority Data

May 13, 2005  (JP) ................................ 2005-141846
May 1, 2006   (WO) ................. PCT/JP2006/309438

(51) Int. Cl.
G02F 1/1337 (2006.01)
(52) U.S. Cl. ........................................ 349/129; 349/130
(58) Field of Classification Search .................... None
See application file for complete search history.

(56) References Cited

U.S. PATENT DOCUMENTS 5,824,377 A * 10/1998 Pirwitz et al. ................ 428/1.23
6,141,075 A    10/2000 Ohmuro et al.
6,512,564 B1   1/2003 Yoshida et al.
6,646,701 B2   11/2003 Lyu et al.
6,710,837 B1 *  3/2004 Song et al. .................... 349/143
2002/0034798 A1  3/2002 Barendse et al.
2002/0080308 A1 * 6/2002 Umemoto et al. .............. 349/96
(Continued)

FOREIGN PATENT DOCUMENTS
EP    0 793 133 A2    9/1997
(Continued)

OTHER PUBLICATIONS

Japanese Office Action mailed Apr. 6, 2010 in corresponding JP application 2007-549756.
(Continued)

Primary Examiner — Lucy Chien
(74) Attorney, Agent, or Firm — Nixon & Vanderhye P.C.

(57) ABSTRACT

A liquid crystal display device comprising, a first substrate, a second substrate, a liquid crystal layer provided between the substrates, a first alignment film provided on the liquid crystal layer side surface of the first substrate, and a second alignment film provided on the liquid crystal layer side surface of the second substrate, wherein the liquid crystal layer includes liquid crystal molecules with negative dielectric anisotropy, the first alignment film and the second alignment film align the liquid crystal molecules substantially vertically to the alignment film surfaces and align the liquid crystal molecules near the first alignment film and the second alignment film such that alignment directions of the liquid crystal molecules near the first and second alignment films are perpendicular to each other, and the first alignment film and the second alignment film are photo-alignment films made of a material having a photosensitive group.

30 Claims, 12 Drawing Sheets

U.S. PATENT DOCUMENTS

| | | | |
|---|---|---|---|
| 2002/0135725 | A1 | 9/2002 | Terashita et al. |
| 2003/0112394 | A1 | 6/2003 | Yoshida et al. |
| 2003/0211342 | A1 | 11/2003 | Nomura et al. |
| 2004/0039150 | A1 | 2/2004 | Shin et al. |
| 2004/0095541 | A1* | 5/2004 | Takeichi et al. ............... 349/139 |
| 2004/0233365 | A1 | 11/2004 | Yoshida et al. |
| 2005/0117100 | A1 | 6/2005 | Terashita et al. |
| 2005/0140837 | A1* | 6/2005 | Crawford et al. ............... 349/42 |
| 2006/0203167 | A1 | 9/2006 | Terashita et al. |
| 2007/0024784 | A1 | 2/2007 | Yoshida et al. |

FOREIGN PATENT DOCUMENTS

| | | |
|---|---|---|
| JP | 10-123576 | 5/1998 |
| JP | 11-133429 | 5/1999 |
| JP | 11-352486 | 12/1999 |
| JP | 2000-053766 | 2/2000 |
| JP | 2001-281669 | 10/2001 |
| JP | 2002-277877 | 9/2002 |
| JP | 2003-73562 | 3/2003 |
| JP | 2004-521997 A | 7/2004 |
| TW | 553932 | 9/2003 |
| TW | 1226960 B | 1/2005 |

OTHER PUBLICATIONS

International Search Report for PCT/JP2006/310077 mailed Sep. 12, 2006.

Taiwanese Office Action mailed Jan. 12, 2010 in corresponding TW application 95116919.

Office Action of U.S. Appl. No. 13/038,535 mailed Apr. 22, 2011; Miyachi.

Office Action of U.S. Appl. No. 13/038,538 mailed Apr. 13, 2011; Miyachi.

Office Action of U.S. Appl. No. 13/038,535 mailed Sep. 7, 2011; Miyachi.

Office Action of U.S. Appl. No. 13/038,538 mailed Sep. 7, 2011; Miyachi.

Notice of Allowance from U.S. Appl. No. 13/038,538, mailed Feb. 6, 2012; Miyachi.

Notice of Allowance from U.S. Appl. No. 13/038,535, mailed Feb. 6, 2012; Miyachi.

* cited by examiner

LIQUID CRYSTAL DISPLAY DEVICE

This application is the U.S. national phase of International Application No. PCT/JP2006/310077, filed 15 May 2006, which designated the U.S. and claims priority to Japanese Patent Application No. 2005-141846, filed 13 May 2005, and PCT/JP2006/309438, filed 1 May 2006, the entire contents of each of which are hereby incorporated by reference.

TECHNICAL FIELD

The present invention relates to a liquid crystal display device. More specifically, the present invention relates to a liquid crystal display device with high display quality, which can provide a wide viewing angle and high-speed response, and can be widely applied to a TV, a monitor for personal computer and the like.

BACKGROUND ART

Liquid crystal display panels in VA (Vertical Alignment) mode have been recently used for liquid crystal display devices such as a monitor for personal computers, and a TV, because of their wide viewing angle characteristic. Among them, practically used are liquid crystal display devices in MVA (Multi-Domain Vertical Alignment) mode in which, as an alignment control structure, one substrate is provided with electrode slits, and the other substrate is provided with projective structures to form a domain division, or liquid crystal display devices in PVA (Patterned Vertical Alignment) mode in which, as an alignment control structure, both substrates are provided with electrode slits to form a domain division.

In MVA mode and PVA mode, however, there was room for improvement in slow response speed. That is, only liquid crystal molecules near the electrode slits and the projective structures fast start to respond, even if a high voltage is applied to change black state to white state, and liquid crystal molecules far from such alignment control structures respond late.

For improvement of the response speed, it is effective that alignment films provided on liquid crystal layer side surfaces of substrates are subjected to an alignment treatment, whereby to provide liquid crystal molecules with pretilt angles previously. Also in VA mode, liquid crystal molecules are previously made slightly incline toward vertical alignment films, and thereby can easily incline when a voltage is applied to the liquid crystal layer. Therefore, the response speed can be made faster. A rubbing method, a SiOx oblique deposition method, and a photo-alignment method may be mentioned as methods of the alignment treatment for providing liquid crystal molecules with the pretilt angles.

The domain division is performed to obtain a wide viewing angle in MVA mode and PVA mode. However, the domain division in MVA mode and PVA mode has room for improvement in that more alignment treatment steps are needed for alignment films. For example, as the rubbing method, a method, in which a region to be rubbed and a region not to be rubbed are separated using a resist pattern to be subjected to a rubbing, has been proposed. As the photo-alignment method, a method, in which one or more times of exposures via a photomask is performed for the domain division, has been proposed. It is desirable that the number of times of such an alignment treatment is fewer in terms of simplification of production steps. However, one pixel has preferably two or more domains, and most preferably four or more domains in order to secure a wide viewing angle. Therefore, a method, in which many domains can be secured by fewer times of alignment treatments, has been needed.

As VA mode in which the domain division is performed, proposed has been VA mode (hereinafter, also referred to as VAECB (Vertical Alignment Electrically Controled Birefringence) mode) using vertical alignment films, in which alignment directions on each other's substrates are antiparallel in any domain, as shown in FIGS. 11A, 11B, 12-1 and 12-2. In VAECB mode, as shown in FIG. 12-1, a direction of an absorption axis of a first polarizer 5 formed on a first substrate side and a direction of an absorption axis of a second polarizer 6 formed on a second substrate side are out of alignment with an alignment direction of a first alignment film 1A and an alignment direction of second alignment direction 2A by 45 degrees. In a mode for dividing one pixel into four domains, which is particularly excellent in viewing angle in VAECB mode, throughput in volume production decreases since the alignment treatment is performed in four directions, i.e. 45, 135, 225, and 315 degrees, as shown in FIG. 12-2. For example, Japanese Kokai Publication No. 2001-281669 discloses a technique, in which an alignment treatment is performed by a photo-alignment method to provide VAECB mode, but this technique needs a total of eight times of exposure processes for the alignment films.

On the other hand, VAHAN (Vertical Alignment Hybrid-aligned Nematic) mode in which one substrate is provided with a vertical alignment film not subjected to an alignment treatment, can decrease the number of times of the alignment treatment. However, there is room for improvement in response speed since a pretilt angle of liquid crystal molecules remains 90 degrees on the one substrate side.

With this problem, proposed has been VA mode (hereinafter, also referred to as VATN (Vertical Alignment Twisted Nematic) mode) using vertical alignment films, in which alignment treatment directions on each other's substrates are perpendicular to each other to make liquid crystal molecules form a twist structure (for example, with reference to Japanese Kokai Publication No. Hei-11-352486, Japanese Kokai Publication No. 2002-277877, Japanese Kokai Publication No. Hei-11-133429, and Japanese Kokai Publication No. Hei-10-123576). In VATN mode, a direction of an absorption axis of a first polarizer and an alignment direction of a first alignment film are the same, and a direction of an absorption axis of a second polarizer and an alignment direction of a second alignment film are the same. Alternatively, the direction of the absorption axis of the first polarizer and the alignment direction of the second alignment film may be the same, and the direction of the absorption axis of the second polarizer and the alignment direction of the first alignment film may be the same. A mode, in which one pixel is divided into four domains in VATN mode, needs only four times of alignment treatments, which is half the number of times in VAECB mode.

Such VATN mode is theoretically excellent in that fewer times of processes can provide a wide viewing angle and high-speed response. However, a technique for producing a liquid crystal display device in VATN mode has not been established yet. There is room for improvement in display brightness characteristic and the like.

SUMMARY OF THE INVENTION

The present invention has been made in view of the above-mentioned state of the art. The present invention has an object to provide a liquid crystal display device capable of providing an improved display brightness characteristic in VATN mode using vertical alignment films, in which alignment treatment directions on each other's substrates are perpendicular to each other.

The present inventors have tried to simplify alignment treatment processes for an alignment film. They have made various investigations about liquid crystal display devices capable of providing a wide viewing angle and high-speed response. They have noted VATN mode using vertical alignment films, in which alignment directions on each other's substrates are perpendicular to each other. However, the results of the investigation showed that it is difficult to obtain a stable transmittance and provide sufficient display brightness characteristic in VATN mode. They have further studied on VATN mode, and found that in VATN mode, a transmittance largely depends on variation in pretilt angle of liquid crystal molecules, such as a difference in pretilt angles between the liquid crystal molecules near an alignment film (first alignment film) provided on one substrate and the liquid crystal molecules near an alignment film (second alignment film) provided on the other substrate. And they have also found that use of a photo-alignment film made of a material having a photosensitive group makes it possible to control such a difference in pretilt angles between the liquid crystal molecules near the first alignment film and the liquid crystal molecules near the second alignment film to less than 1.0 degree, whereby to provide a stable transmittance. Thereby the above-mentioned problems have been solved, leading to completion of the present invention.

That is, the present invention provides a liquid crystal display device comprising a first substrate, a second substrate, a liquid crystal layer provided between the substrates, a first alignment film provided on the liquid crystal layer side surface of the first substrate, and a second alignment film provided on the liquid crystal layer side surface of the second substrate, wherein the liquid crystal layer includes liquid crystal molecules with negative dielectric anisotropy, the first alignment film and the second alignment film align the liquid crystal molecules substantially vertically to the alignment film surfaces and align the liquid crystal molecules near the first alignment film and the second alignment film such that alignment directions of the liquid crystal molecules near the first and second alignment films are perpendicular to each other, and the first alignment film and the second alignment film are photo-alignment films made of a material having a photosensitive group.

The present invention also provides a liquid crystal display device comprising, a first substrate, a second substrate, a liquid crystal layer provided between the substrates, a first alignment film provided on the liquid crystal layer side surface of the first substrate, and a second alignment film provided on the liquid crystal layer side surface of the second substrate, wherein the liquid crystal layer includes liquid crystal molecules with negative dielectric anisotropy, the first alignment film and the second alignment film align the liquid crystal molecules substantially vertically to the alignment film surfaces and align the liquid crystal molecules near the first alignment film and the second alignment film such that alignment directions of the liquid crystal molecules near the first and second alignment films are perpendicular to each other, and a difference in pretilt angles between the liquid crystal molecules near the first alignment film and the liquid crystal molecules near the second alignment film is less than 1.0 degree.

BRIEF DESCRIPTION OF THE DRAWINGS

FIG. 1A shows OFF-state, and FIG. 1B shows ON-state.

FIGS. 2-1A and 2-1B are conceptual views each showing positional relationships of alignment directions of alignment films and absorption axes of polarizers in one domain of the liquid crystal display device in VATN mode in Embodiment 1. FIGS. 2-1A and 2-1B each show one example of the positional relationships.

FIG. 2-2 is a conceptual view showing a relationship of four domains and alignment directions of alignment films in one pixel of the liquid crystal display device in VATN mode in Embodiment 1.

FIG. 7A shows OFF-state, and FIG. 7B shows ON-state.

FIG. 8A shows OFF-state, and FIG. 8B shows ON-state.

FIG. 9A shows OFF-state, and FIG. 9B shows ON-state.

FIG. 10A shows OFF-state, and FIG. 10B shows ON-state.

FIG. 11A shows OFF-state, and FIG. 11B shows ON-state.

FIG. 12-2 is a conceptual view showing a relationship of four domains and alignment directions of alignment films in one pixel of a liquid crystal display device in VAECB mode.

EXPLANATION OF SYMBOLS AND NUMERALS

Figure 1A:
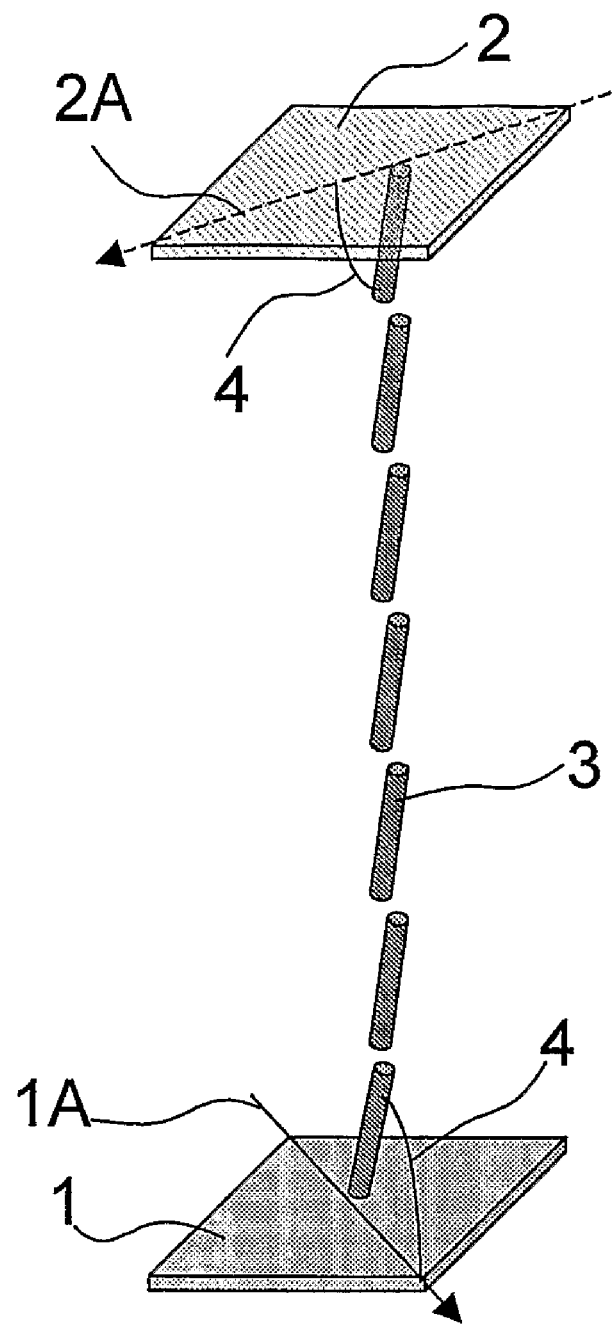
FIGS. 1A and 1B are conceptual views each showing a drive principle of a liquid crystal display device in VATN mode in Embodiment 1.

1: first alignment film
1A: alignment direction of first alignment film
2: second alignment film
2A: alignment direction of second alignment film
3: liquid crystal molecule
4: pretilt angle
5: direction of an absorption axis of first polarizer
6: direction of an absorption axis of second polarizer

DETAILED DESCRIPTION OF THE INVENTION

The present invention will, hereinafter, be described in more detail.

The liquid crystal display device according to the present invention comprises, as a basic configuration of liquid crystal display device, a first substrate and a second substrate, a liquid crystal layer provided between the first and second substrates, a first alignment film provide on the liquid crystal layer side surface of the first substrate, and a second alignment film provided on the liquid crystal layer side of the second substrate. The configuration of the liquid crystal display device according to the present invention is not especially limited as long as the above-mentioned components are essentially comprised. The liquid crystal display device may or may not comprise other components.

In the liquid crystal display device of the present invention, as a basic configuration of VATN mode, the liquid crystal layer includes liquid crystal molecules with negative dielectric anisotropy, and the first alignment film and the second alignment film align the liquid crystal molecules substantially vertically to the alignment film surfaces and align the liquid crystal molecules near the first alignment film and the second alignment film such that alignment directions of the liquid crystal molecules near the first and second alignment films are perpendicular to each other. Use of the liquid crystal layer and the alignment film makes it possible to provide a liquid crystal display device in VATN mode in which the liquid crystal molecules align substantially vertically to the substrate surfaces and form a twist structure between the substrates.

The liquid crystal display device according to the present invention has at least one of the following configurations (1) and (2): (1) a configuration, in which the first alignment film and the second alignment film (hereinafter, also referred to as "alignment film of the present invention") are photo-alignment films made of a material having a photosensitive group (hereinafter, also referred to as "photosensitive material"); and (2) a configuration, in which a difference in pretilt angles between the liquid crystal molecules near the first alignment film and the liquid crystal molecules near the second alignment film is less than 1.0 degree. In the present description, the "photo-alignment film" means a film made of a material, in which an alignment regulating force changes by light irradiation. The above-mentioned material having a photosensitive group (photosensitive material) is subjected to an alignment treatment by light irradiation while controlling a wavelength, an amount of light, an irradiation angle, a polarization direction, and the like. Thereby, the pretilt angles of the liquid crystal molecules can be controlled with high-accuracy to provide an alignment film with stable pretilt angles. However, the material having a photosensitive group (photosensitive material) in the above configuration (1) includes no materials generating photodecomposition (photodecomposition type materials).

According to such a present invention, the pretilt angle of the liquid crystal molecules is controlled with high accuracy near the first and second alignment films. Thereby, a stable transmittance can be provided in a liquid crystal display device in VATN mode in which variation in pretilt angle greatly decreases the transmittance. Therefore, the display brightness characteristic can be improved.

Preferable configurations in the above-mentioned configuration (1) are as follows: (1-1) a configuration, in which the photo-alignment films provide the liquid crystal molecules near the first alignment film and the second alignment films with substantially uniform pretilt angles; (1-2) a configuration, in which the pretilt angles of the liquid crystal molecules near the first alignment film and the second alignment film are 89 degrees or less; (1-3) a configuration, in which the first alignment film and/or the second alignment film are/is photo-alignment films/a photo-alignment film made of a material having at least one photosensitive group selected from the group consisting of a 4-chalcone group (the following formula (1)), a 4'-chalcone group (the following formula (2)), a coumarin group (the following formula (3)), and a cinnamoyl group (the following formula (4)); and (1-4) a configuration, in which each of the first alignment film and the second alignment film has at least one structure selected from the group consisting of a bond-structure, a photoisomerization structure, and a photo-realignment structure of the photosensitive group. The photosensitive group in the following formulae (1) to (4) may have a structure in which a substituent group is bonded to the benzene ring. A cinnamate group ($C_6H_5$—CH=CH—COO—), in which an oxygen atom is bonded to the carbonyl group in the cinnamoyl group represented by the formula (4), has an advantage of easy synthesis. Therefore, it is more preferable in the above configuration (1-3) that the first alignment film and/or the second alignment film are/is photo-alignment films/a photo-alignment film made of a material having the cinnamate group. In the above configuration (1-4), the term "a bond-structure, a photoisomerization structure, and a photo-realignment structure of the photosensitive group" means that a bond-structure of the photosensitive group, a photoisomerization structure of the photosensitive group, and a photo-realignment structure of the photosensitive group.

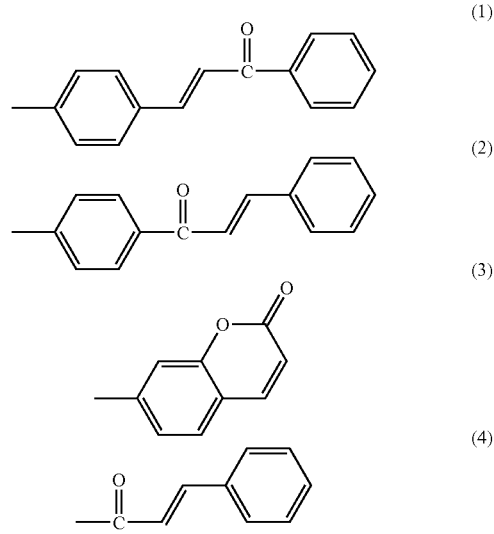

According to the above configuration (1-1), the variation in pretilt angle can be effectively suppressed, and a stable transmittance can be easily provided in liquid crystal display devices in VATN mode. In the above configuration (1-1), the term "substantially uniform" means that the pretilt angles need not to be exactly uniform but need to be uniform enough for achievement of effects of the present invention. More specifically, in the above configuration (1-1), a difference in pretilt angles between the liquid crystal molecules near the first alignment film and the liquid crystal molecules near the second alignment film is preferably less than 1.0 degree, and more preferably 0.5 degrees or less.

The above configuration (1-2) can provide liquid crystal display devices in VATN mode having a high transmittance equivalent of liquid crystal display devices in VAECB mode.

In the above configuration (1-3), the photosensitive groups represented by the formulae (1) to (4) generate a crosslinking-reaction (including dimerization reaction), an isomerization reaction, a photo-realignment, and the like. Such a configuration can effectively suppress the variation in pretilt angle, and therefore can provide liquid crystal display devices in VATN mode having a stable transmittance. For example, in a photosensitive material having a cinnamoyl group, a dimerization reaction is generated by light irradiation as shown in the following formulae (5) and (6), and also a trans-cis isomerization reaction is generated, as shown in the following formula (7). That is, it is preferable that the above-mentioned material having a photosensitive group (photosensitive material) is a material generating a photobonding reaction (photobonding type material). And it is preferable that the alignment film of the present invention is a photobonding type alignment film.

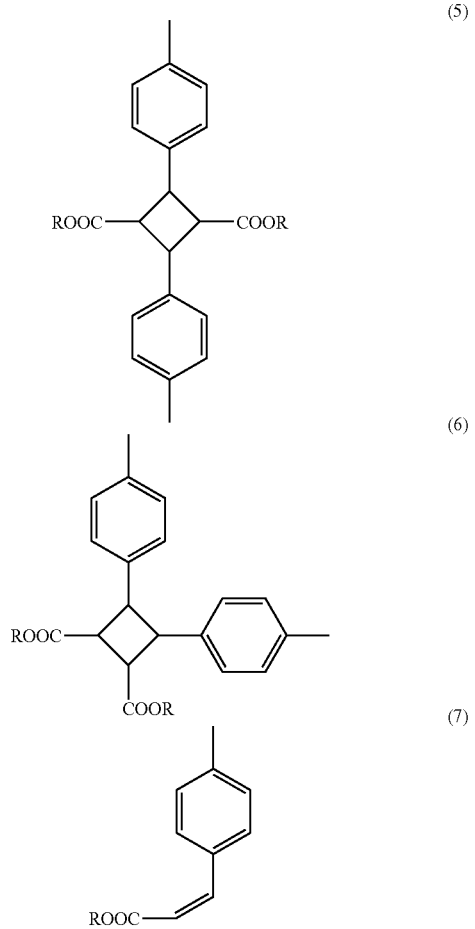

Accordingly, the above configuration (1-4) also can effectively suppress the variation in pretilt angle. Therefore, such a configuration is a preferable configuration for providing liquid crystal display device in VATN mode having a stable transmittance.

The bond-structure of the photosensitive group in the above configuration (1-4) means a structure, in which photosensitive functional groups contained in constituent molecules of the photosensitive material are bonded to each other by light irradiation. It is preferable that the bond-structure of the photosensitive group in the above configuration (1-4) is formed by a crosslinking reaction. In this case, the bond-structure can be formed, for example, by irradiation of light with a wavelength of 250 to 400 nm. The above-mentioned crosslinking reaction includes a dimerization reaction and means that a chemical bond is formed between some specific atoms in a linear polymer molecule. The above-mentioned photosensitive material generally has a molecular structure, in which a plurality of side chains is bonded to a linear main chain, and the side chain contains a photosensitive group (photoreaction group). Therefore, in the above-mentioned photosensitive material, a crosslinking reaction such as a dimerization reaction of the photosensitive group is generated by light irradiation between two side chains to form a crosslinking structure. Therefore, the alignment film of the present invention has a bond-structure of the photosensitive group.

The photoisomerization structure of the photosensitive group in the above configuration (1-4) means a structure, in which a photosensitive functional group contained in the constituent molecules of the photosensitive material has been isomerized by light irradiation. Therefore, the alignment film of the present invention having such a photoisomerization structure of the photosensitive group has a structure, for example, in which the photosensitive group of cis isomerism (or trans isomerism) contained in the photosensitive material has changed to that of trans isomerism (or cis isomerism) through excited state by light irradiation.

The photo-realignment structure of the photosensitive group in the above configuration (1-4) means a structure, in which a photosensitive functional group contained in the constituent molecules of the photosensitive material has been photo-realigned. The "photo-realignment" means that a photosensitive functional group contained in the constituent molecules of the photosensitive material changes its direction by light irradiation without being isomerized. Therefore, the alignment film of the present invention having such a photo-alignment structure of the photosensitive group has a structure, for example, in which the photosensitive group of cis isomerism (or trans isomerism) contained in the photosensitive material has changed its direction while remaining its isomerism through excited state by light irradiation.

As mentioned above, the alignment film of the present invention may include a photosensitive group contained in the photosensitive material as it is, as in the above cases where the alignment film of the present invention has the photoisomerization structure or the photo-realignment structure in the above configuration (1-4). The photobonding type alignment film generally exhibits an alignment regulating force by light irradiation in a state where the bond-structure, the photoisomerization structure, and the photo-realignment structure of the photosensitive group are mixed.

It is preferable that a difference in pretilt angles between the liquid crystal molecules near the first alignment film and the liquid crystal molecules near the second alignment film is 0.5 degrees or less in the above-mentioned configuration (2).

In this case, the variation in pretilt angle can be effectively suppressed.

In the above configuration (2), preferred is a configuration (2-1), in which the pretilt angles of the liquid crystal molecules near the first alignment film and the second alignment film are 89 degrees or less. Such a configuration can provide a liquid crystal display device, even in VATN mode, having a high transmittance equivalent of a liquid crystal display device in VAECB mode.

In the above configuration (2), preferred is a configuration (2-2), in which the first alignment film and/or the second alignment film are/is photo-alignment films/a photo-alignment film made of a material having at least one photosensitive group selected from the group consisting of a 4-chalcone group (the above formula (1)), a 4'-chalcone group (the above formula (2)), a coumarin group (the above formula (3)), and a cinnamoyl group (the above formula (4)). The photosensitive group in the above formulae (1) to (4) may have a structure in which a substituent group is bonded to the benzene ring. Such a configuration can effectively suppress the variation in pretilt angle, similar to the above configuration (1-3). Therefore, liquid crystal display devices in VATN mode having a stable transmittance can be produced. It is more preferable in the above configuration (2-2) that the first alignment film and/or the second alignment film are/is photo-alignment films/a photo-alignment film made of a material having the cinnamate group, from the same viewpoint as in the above configuration of (1-3).

In the present invention, it is preferable that the first alignment film and the second alignment film each has two or more regions in one pixel, and among the two or more regions, an alignment direction is different. Such a domain division allows for a wide viewing angle. In VATN mode, for example, two regions having alignment directions different to each other by substantially 180 degrees are formed on both the first alignment film and the second alignment film. And the two alignment films are placed opposite such that the alignment direction of the first alignment film and the alignment direction of the second alignment film are perpendicular to each other. Thereby, four domains are formed in one pixel because each region of the first alignment film are divided and aligned by each region of the second alignment film. Accordingly, if one pixel is divided into four domains, two times of alignment treatment processes for domain division are provided for each of the first alignment film and the second alignment film, that is, a total of four times of alignment treatment processes is enough in VATN mode. Therefore, the alignment treatment processes in VATN mode can be reduced as compared to VAECB mode, because VAECB mode needs a total of eight times of alignment treatment processes, in which four times of alignment treatment processes are provided for each of the first alignment film and the second alignment film. As mentioned above, each alignment film has two or more regions in one pixel, and among the two or more regions, an alignment direction is different. Thereby, the one pixel can be divided into four or more domains, whereby to provide a sufficient viewing angle.

The above-mentioned configurations may be combined for the present invention.

The liquid crystal display device of the present invention can provide a stable transmittance and thereby improves a display brightness characteristic in VATN mode using vertical alignment films, in which alignment directions on each other's substrates are perpendicular to each other.

BEST MODE FOR CARRYING OUT THE INVENTION

The present invention is described in more detail with reference to Embodiments, but the present invention is not limited to the Embodiments.

Embodiment 1

Figure 1B:
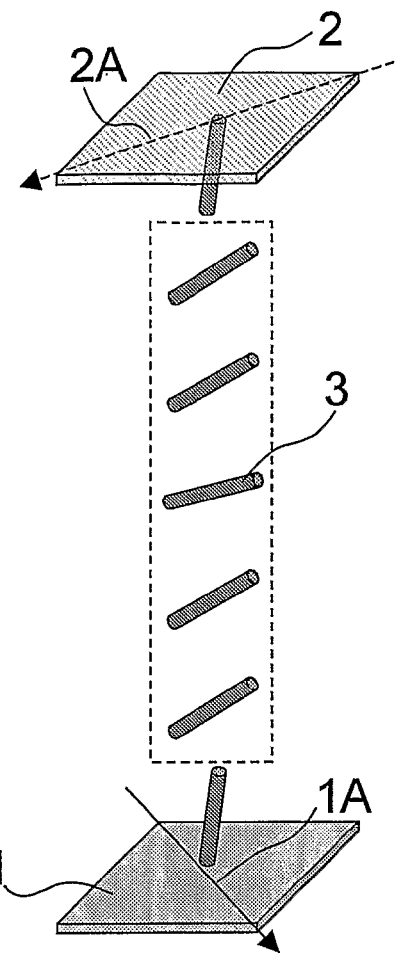

FIGS. 1A and 1B are conceptual views each showing a drive principle of a liquid crystal display device in VATN mode in Embodiment 1. FIG. 1A shows OFF-state, and FIG. 1B shows ON-state.

In a liquid crystal display device in VATN mode, as shown in FIG. 1A, the first alignment film and the second alignment film align the liquid crystal molecules substantially vertically to the alignment film surfaces (the substrate surfaces) and align the liquid crystal molecules near the first alignment film and the second alignment film such that alignment directions of the liquid crystal molecules near the first and second alignment films are perpendicular to each other, at OFF-state when the voltage applied between the substrates interposing the liquid crystal layer is less than a threshold voltage. In the present description, the "alignment direction of the liquid crystal molecules" means a direction shown by projecting a tilt direction of the liquid crystal molecule near the first or second alignment film on to the substrate surface. And "alignment directions of the liquid crystal molecules near the first and second alignment films are perpendicular to each other" means that the alignment direction of the liquid crystal molecules near the first alignment film and the alignment direction of the liquid crystal molecules near the second alignment film do not necessarily need to be completely perpendicular to each other as long as the liquid crystal molecules can be aligned such that the alignment directions are substantially perpendicular to each other to provide liquid crystal display in VATN mode. And the alignment direction of the first alignment film and the alignment direction of the second alignment film preferably cross at 85 to 95 degrees. As shown in FIG. 1B, the liquid crystal molecules with negative dielectric anisotropy align parallel to the substrate surfaces depending on the applied voltage, and show birefringence to light transmitted through the liquid crystal display panel, at ON-state when the voltage applied between the substrates interposing the liquid crystal layer is more than a threshold voltage.

A production method of the liquid crystal display device in VATN mode in Embodiment 1 is hereinafter described.

In Embodiment 1, a pair of a first substrate and a second substrate each having no alignment film were first prepared by a usual method.

A thin film transistor array substrate was prepared as the first substrate that was one substrate. The thin film transistor array substrate was prepared: by forming scanning signal lines and data signal lines so as to intersect with each other on grid with an insulating film therebetween on a glass substrate; and by forming a thin film transistor and a pixel electrode at each of the intersections, the scanning signal line, the data signal line, the thin film transistor and the pixel electrode being provided by the following (1) to (6) steps of: forming a stacked body of thin films; and then patterning the stacked body.

(1) a thin film formation step using a spatting, plasma-enhanced Chemical vapor deposition (PCVD), vacuum deposition; etc.;

(2) a resist application step of applying resist to the substrate by a spin coating, a roll coating, etc., and then baking the resist;

(3) an exposure step using an exposure method such as a lens projection (stepper) method, a mirror projection method, and a proximity method;

(4) a development step;

(5) an etching step using a dry etching, a wet etching, etc.; and (6) a resist separation step using a plasma (dry) ashing, a wet separation, etc.

A color filter substrate was prepared as the second substrate that was the other substrate. The color filter substrate was prepared by successively forming (1) a black matrix, (2) a colored pattern of RGB, (3) a protective film, and (4) a transparent electrode film on a glass substrate.

Then, a solution containing an alignment film material (photosensitive material) was applied to the first and second substrates by the spin cast method, and then the substrates were calcined at 180 degrees C. for 60 minutes to form alignment films. A material containing 4-chalcone group was used as the alignment film material in Embodiment 1.

Figures 1A, 2:
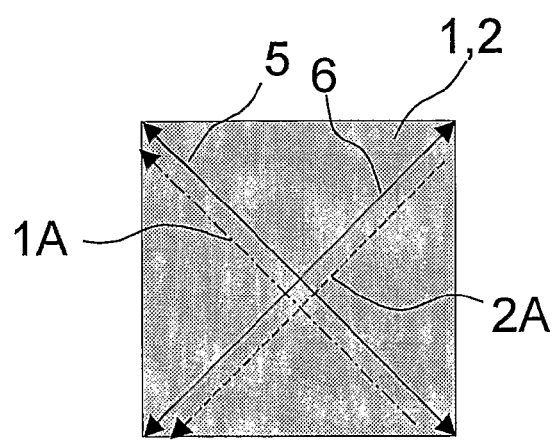
Figures 1B, 2:
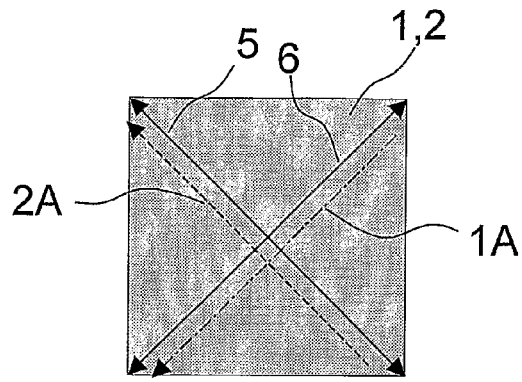
Figure 2:
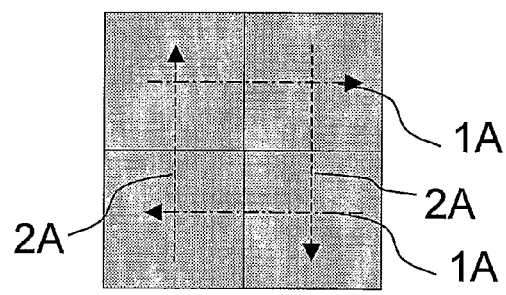
Figures 1, 12:
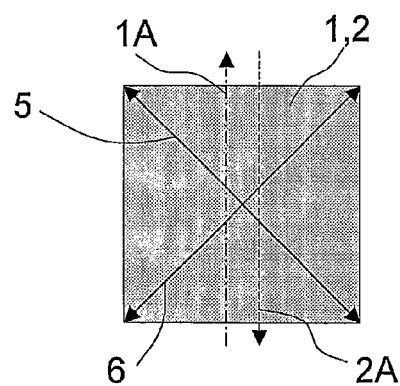
FIG. 12-1 is a conceptual view showing positional relationships of alignment directions of alignment films and absorption axes of polarizers in one domain of a liquid crystal display device in VAECB mode.
Figures 2, 12:
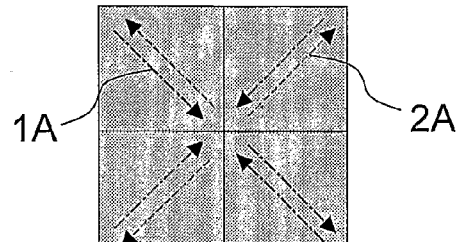

Then, pretilt angles of the liquid crystal molecules near the first alignment film and the second alignment film were each set at 88.5 degrees by an alignment treatment by light irradiation along alignment directions shown in FIG. 2-1. The alignment treatment was performed by emitting p-polarized light with a wavelength of 365 nm to alignment films at an incident angle of 40 degrees, at 3 mW/cm$^2$ for 400 seconds. Constituent molecules of the alignment film have a photofunctional group (photosensitive group) at a side chain of a polymer chain. And the photofunctional group forms a dimer by a dimerization reaction caused by the above-mentioned alignment treatment, whereby to form a crosslinking structure (cross-linking bond structure). Part of the constituent molecules of the alignment film generates an cis-trans isomerization through an isomerization reaction caused by the alignment treatment, and another part of the constituent molecules generates a photo-realignment by the alignment treatment.

In Embodiment 1, each pixel region on the first substrate was divided into two regions for alignment treatment and the two regions were each irradiated with light in opposite directions to each other.

And each pixel region on the second substrate was similarly divided into two regions for alignment treatment and the two regions were each irradiated with light in opposite directions to each other.

Then, a seal was formed and a spacer was disposed, and then the first substrate and the second substrate were attached such that the alignment treatment direction on the first substrate and the alignment treatment direction on the second substrate were perpendicular to each other, as shown in FIG. 2-2. Thereby, four domain regions having different twist directions of liquid crystal molecules could be formed in each pixel region.

Then, liquid crystal molecules with negative dielectric anisotropy were injected between the attached first and second substrates.

Then, polarizers were attached such that a relationship between the alignment direction of the alignment film and the direction of the absorption axis of the polarizer on each substrate satisfied a relationship shown in FIG. 2-1A or FIG. 2-1B to produce a liquid crystal display panel in VATN mode. Then, a mounting step was performed to produce a liquid crystal display device.

Comparative Embodiment 1

A liquid crystal display panel in VATN mode was produced by an alignment treatment by light irradiation in the same manner as in Embodiment 1, except that a photodecomposition type alignment film material was used as the alignment film material, and p-polarized light with a wavelength of 254 nm was emitted to alignment films at 2 mW/cm$^2$ for 500 seconds to generate a photodecomposition reaction in constituent molecules of the alignment films.

A plurality of liquid crystal display panels prepared by the method in the above-mentioned Embodiment 1 or Comparative Embodiment 1 was measured for pretilt angle. The pretilt angle was measured with commercially available measurement device for tilt angle (trade name: OPTIPRO, product of Shintex Japan Corp.). The measurement results show that the liquid crystal display panels having the photobonding (dimerization) alignment film, which were produced by the method in Embodiment 1, have a pretilt angle of 88.5±0.5 degrees. On the other hand, the measurement results shows that the liquid crystal display panels having the photodecomposition type alignment film, which were produced by the method in Comparative Embodiment 1, have a pretilt angle of 88.5±1.0 degrees. The above-mentioned measurement device provides an averaged value of the pretilt angle near the first alignment film and the pretilt angle near the second alignment film. A variation in the averaged values of the pretilt angles measured in the plurality of liquid crystal display panels shows that a difference in pretilt angle between the liquid crystal molecules near the first alignment film and the liquid crystal molecules near the second alignment film was ±0.5 degrees if the photobonding (dimerization) alignment film was used (in Embodiment 1). On the other hand, it is shown that a difference in pretilt angle between the liquid crystal molecules near the first alignment film and the liquid crystal molecules near the second alignment film was ±1.0 degree if the photo decomposition type alignment film was used (in Comparative Embodiment 1).

Figure 3:
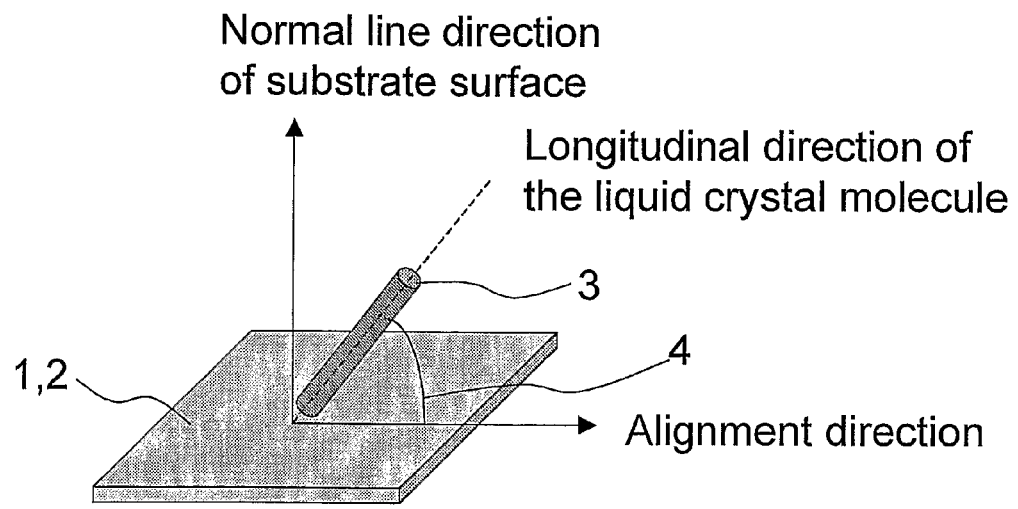
FIG. 3 is a conceptual view showing a pretilt angle of a liquid crystal molecule.

In the present description, the "pretilt angle" means, as shown in FIG. 3, an angle formed by the alignment film surface and a longitudinal direction of the liquid crystal molecule near the alignment film when a voltage less than a threshold voltage is applied to the liquid crystal layer (at OFF-state). And an angle formed by the alignment film surface and the longitudinal direction of the liquid crystal molecule near the alignment film, regardless of OFF state or ON state, is called tilt angle or polar angle.

As mentioned above, if the material, which changes the conformation by the bonding reaction, and the like, of the photosensitive group caused by light irradiation, was used to control the pretilt angle of the liquid crystal molecules, the variation in pretilt angle was 0.5 degrees, which was smaller than the variation in pretilt angle in Comparative Embodiment 1. Therefore, a stable pretilt angle can be provided. This is because the bonding reaction of the photosensitive group has a saturation characteristic to the amount of light irradiation.

On the other hand, in Comparative Embodiment 1, the variation in pretilt angle was 1.0 degree, which was larger than the variation in pretilt angle in Embodiment 1, because the material generating the photodecomposition reaction caused by the light irradiation was used to control the pretilt angle of the liquid crystal molecules. This is because, in the photodecomposition type photo-alignment film, the pretilt tends to incline more and more as the amount of light irradiation becomes larger, that is, the photodecomposition reaction exhibits no saturation characteristic, and therefore the variation in amount of light irradiation is directly linked to the variation in pretilt angle.

Figure 9A:
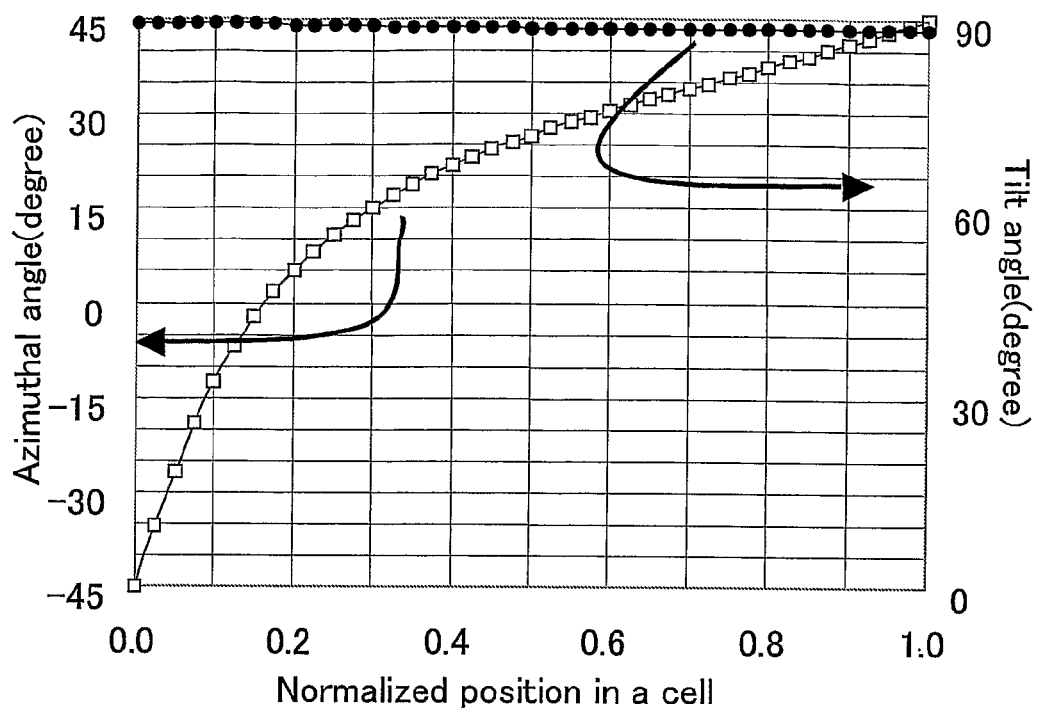
FIGS. 9A and 9B are graphs showing tilt angles and azimuthal angles of liquid crystal molecules when a pretilt angle of the liquid crystal molecules near a first alignment film is 89.5 degrees and a pretilt angle of the liquid crystal molecules near a second alignment film is 88.5 degrees in a liquid crystal display device in VATN mode.
Figure 9B:
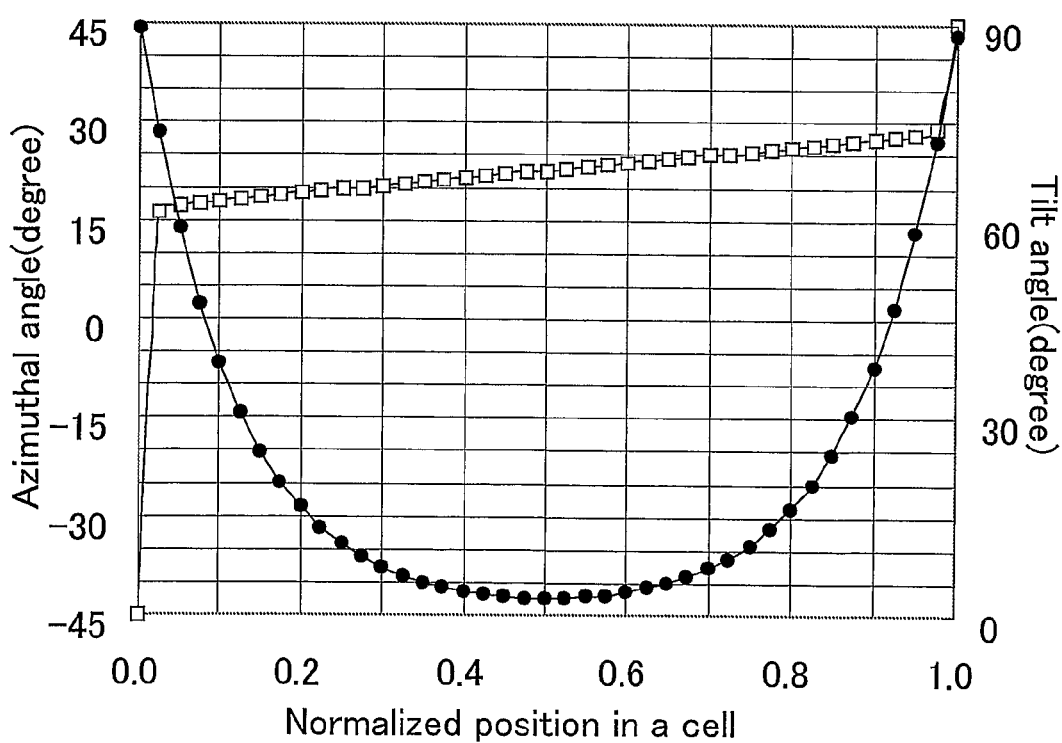

Then, the liquid crystal display panels prepared in Embodiment 1 and Comparative Embodiment 1 were measured for transmittance, which shows that the transmittance varies largely in the liquid crystal display panels having the photodecomposition type alignment film, which were produced in Comparative Embodiment 1. In order to investigate the cause, only the direction of the panel was turned while the directions of the absorption axis of the polarizers remained perpendicular to each other. Then, it was proved that the direction providing the maximum transmittance is out of alignment from its original direction in the liquid crystal display device having the photodecomposition type alignment film, which was prepared in Comparative Embodiment 1. Further investigation of this matter shows that, in the liquid crystal display device in VATN mode, the alignment direction of the liquid crystal molecules at the center of the panel was largely out of alignment from 0 degree at the time of voltage application if the pretilt angle largely varies, as shown in FIGS. 9A, 9B, and the like, mentioned below.

Therefore, the results in Embodiment 1 and Comparative Embodiment 1 show that the control of the variation in pretilt angle is important for display uniformity in VATN mode, and that as the pretilt angle on the first substrate and the pretilt angle on the second substrate becomes asymmetric, the transmittance decrease more and more. And it turns out that use of the photobonding (dimerization) alignment film is effective for the suppression of the variation in pretilt angle. Particularly when a liquid crystal display panel for TV is produced, an alignment film formed on a substrate in 1 m or more on a side is usually subjected to an alignment treatment for increase in size of a liquid crystal display TV and improvement in production efficiency. Accordingly, unevenness in irradiance of exposure on the substrate surface is difficult to prevent completely. Therefore, it is desired that variation in pretilt caused by variation in irradiance is effectively suppressed.

(Evaluation Test)

A liquid crystal display device in VATN mode was prepared. The liquid crystal display devices had an alignment film prepared by changing the strength and time of the light irradiation in the alignment treatment by light irradiation in Embodiment 1 to set pretilt angles of liquid crystal molecules near the first alignment film and the second alignment film at 85 to 90 degrees.

In the present invention, the pretilt angle can be controlled by adjusting the material for the alignment film, the light irradiation angle, and the like. If the material for the alignment film is adjusted, the pretilt angle can be controlled by adjusting a component and the number of a side chain, a polar group and the like. If the light irradiation angle is adjusted, the pretilt angle can be larger by increasing an irradiation angle.

And a liquid crystal display device in VAECB mode, in which the pretilt angles of the liquid crystal molecules near the first alignment film and the second alignment film were set at 85 to 90 degrees, was prepared for comparison.

(Relationship of Pretilt Angle and Contrast Ratio)

Figure 4:
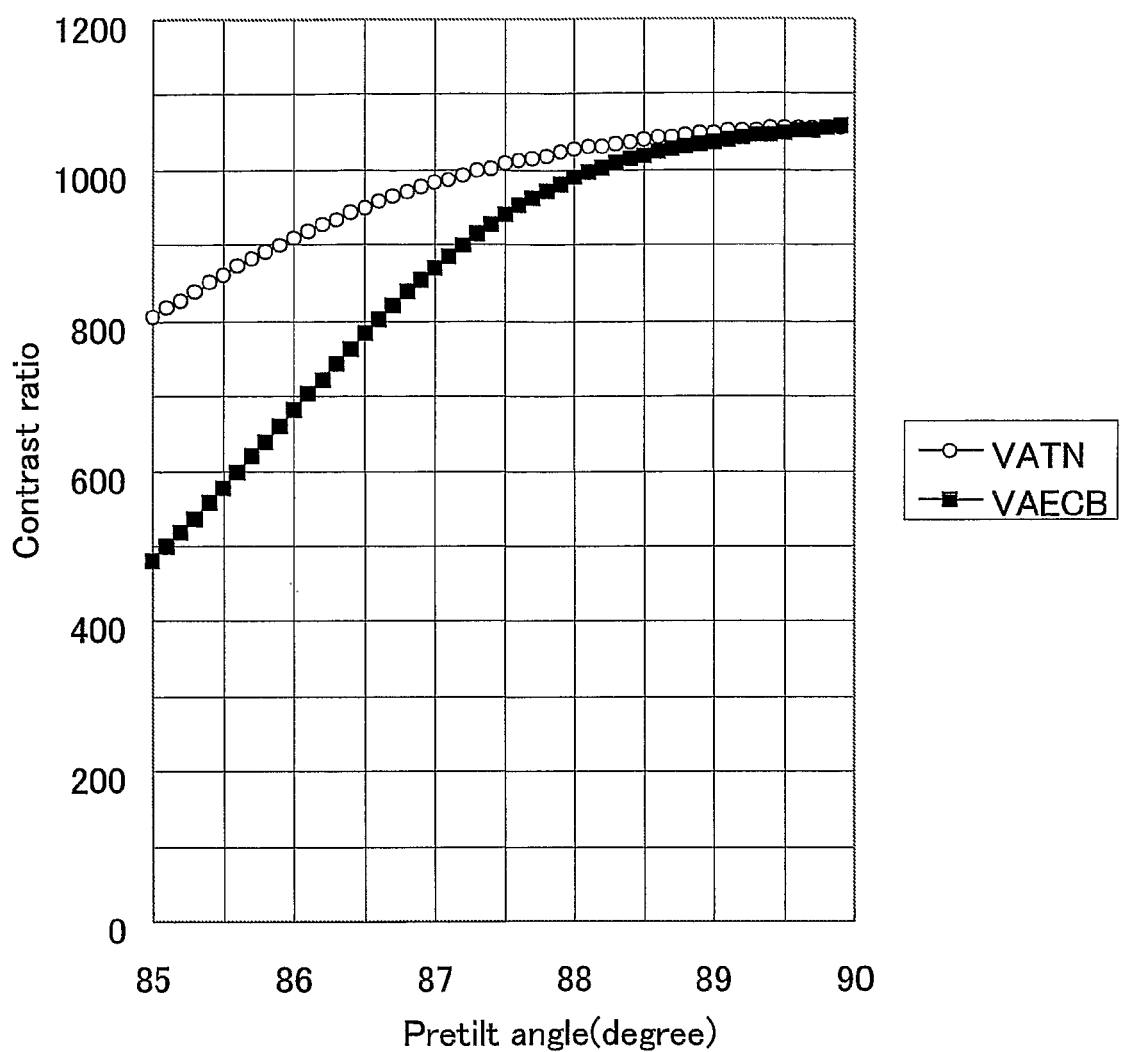
FIG. 4 is a graph showing each relationship of a pretilt angle and a contrast ratio in liquid crystal display devices in VATN mode and VAECB mode.

FIG. 4 is a graph showing each relationship of a pretilt angle and a contrast ratio in liquid crystal display devices in VATN mode and VAECB mode. And FIG. 4 shows the case where the pretilt angles of the liquid crystal molecules near the first alignment film and the second alignment film are the same.

If the pretilt angles of the liquid crystal molecules near the first alignment film and the second alignment film are the same, as shown in FIG. 4, VATN mode has an advantage over VAECB mode in terms of high contrast ratio. That is, VATN mode shows a smaller decrease in contrast ratio than that in VAECB mode when the pretilt angle is decreased, and the decrease in contrast ratio can be suppressed to 10% or less to the maximum contrast ratio in VATN mode. This is because the alignment direction of the first alignment film and the alignment direction of the second alignment film are perpendicular to each other in VATN mode, and therefore a slight change in retardation on the first alignment film side and that on the second alignment film side are canceled with each other, although the slight change in retardation caused by decreasing the pretilt angle of the liquid crystal molecules generates light leakage at black display (at OFF state) in VAECB mode.

It is generally known that the response speed from OFF state to ON state can be improved by decreasing the pretilt angle of the liquid crystal molecule (increasing a tilt angle) in VA mode. Therefore, VATN mode has an advantage over VAECB mode in terms of improvement of response speed, because the decrease in contrast ratio is small if the pretilt angle is decreased.

(Relationship of Pretilt Angle and Voltage-Transmittance Curve)

Figure 5A:
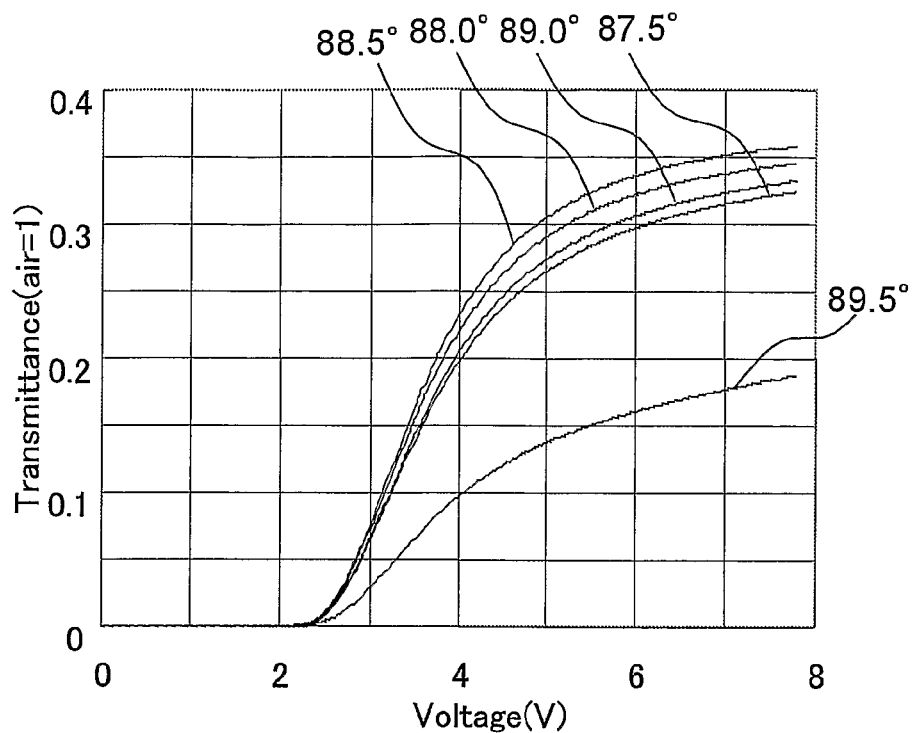
FIG. 5A shows a change in voltage-transmittance curve when a pretilt angle is changed in a liquid crystal display device in VATN mode.
Figure 5B:
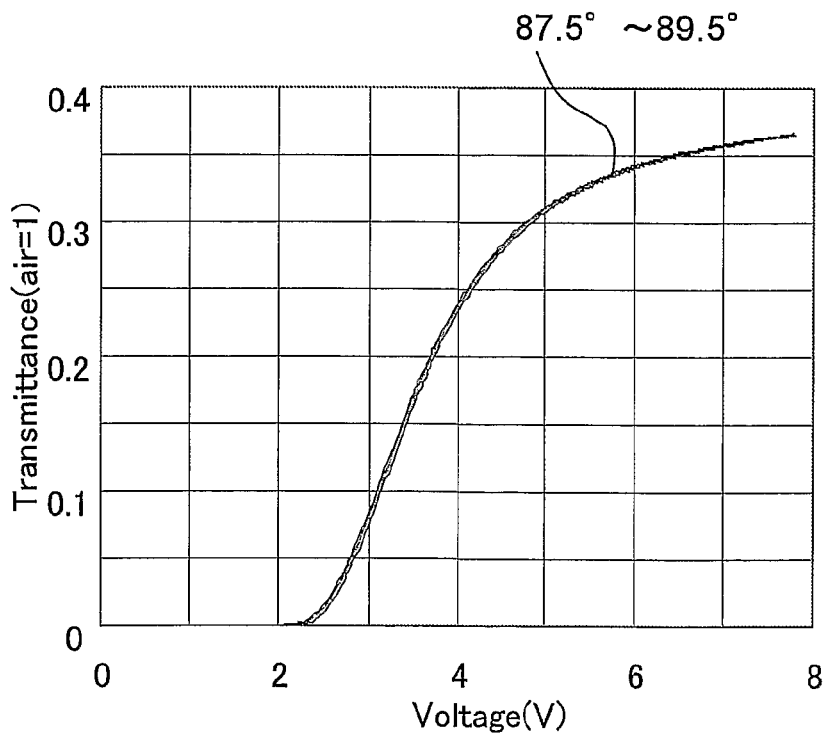
FIG. 5B shows a change in voltage-transmittance curve when a pretilt angle is changed in a liquid crystal display device in VAECB mode.
Figure 6:
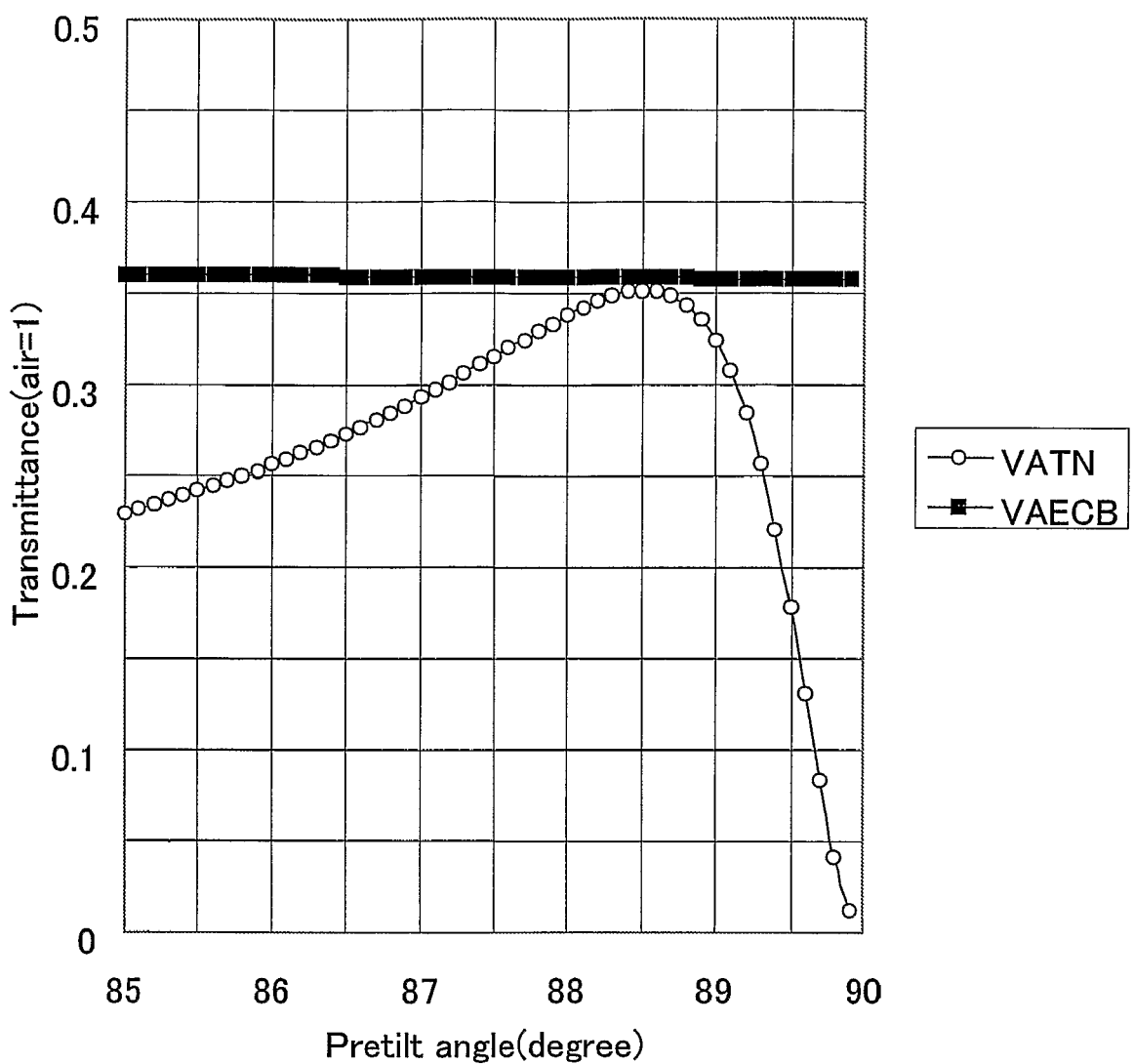
FIG. 6 is a graph showing each change in transmittance at 6.2 V when a pretilt angle of liquid crystal molecules near the second alignment film is changed in liquid crystal display devices in VATN mode and in VAECB mode.

FIG. 5A shows a change in voltage-transmittance curve when a pretilt angle is changed in a liquid crystal display device in VATN mode. FIG. 5B shows a change in voltage-transmittance curve when a pretilt angle is changed in a liquid crystal display device in VAECB mode. And FIGS. 5A and 5B each show the case where the pretilt angle of the liquid crystal molecules near the first alignment film was fixed at 88.5 degrees. FIG. 6 is a graph showing each change in transmittance at 6.2 V when a pretilt angle of liquid crystal molecules near the second alignment film is changed in liquid crystal display devices in VATN mode and in VAECB mode. And FIG. 6 shows the case where the pretilt angle of the liquid crystal molecules near the first alignment film was fixed at 88.5 degrees.

VATN mode shows excellent rising property of transmittance to change in voltage at 88.5 degrees as shown in FIG. 5A, but the rising property rapidly decreases particularly when the pretilt angle approaches 90 degrees as shown in FIG. 6 if the pretilt angle of the liquid crystal molecules near the second alignment film is changed while the pretilt angle of the liquid crystal molecules near the first alignment film is fixed at 88.5 degrees.

On the other hand, in VAECB mode, the rising property of transmittance to change in voltage hardly changes, as shown in FIGS. 5B and 6, if the pretilt angle of the liquid crystal molecules near the second alignment film is changed while the pretilt angle of the liquid crystal molecules near the first alignment film is fixed at 88.5 degrees.

As mentioned above, VATN mode shows a large decrease in transmittance as compared with VAECB mode, as the difference in pretilt angle between the liquid crystal molecules near the first alignment film and the liquid crystal molecules near the second alignment film increases. Therefore, it is shown that it is extremely important to control the pretilt angle for improvement in display properties in VATN mode. FIG. 6 shows that VATN mode stably provides high transmittance when the pretilt angle of the liquid crystal molecules near the second alignment film is 87.5 to 89.0 degrees. Therefore, it is shown that it is preferable to set the difference in pretilt angle between the liquid crystal molecules near the first alignment film and the liquid crystal molecules near the second alignment film at less than 1.0 degree, and to set the pretilt angles of the liquid crystal molecules near the first alignment film and the second alignment film at 89 degrees or less.

(Relationship of Pretilt Angle and Behavior of Liquid Crystal Molecule)

FIGS. 7A to 10B each show tilt angles and azimuthal angles of the liquid crystal molecules at OFF state (voltage applied to the liquid crystal layer: 1.5 V) and at ON state (voltage applied to the liquid crystal layer: 6.2 V) in the above-mentioned liquid crystal display devices in VATN mode and VAECB mode.

Figure 7A:
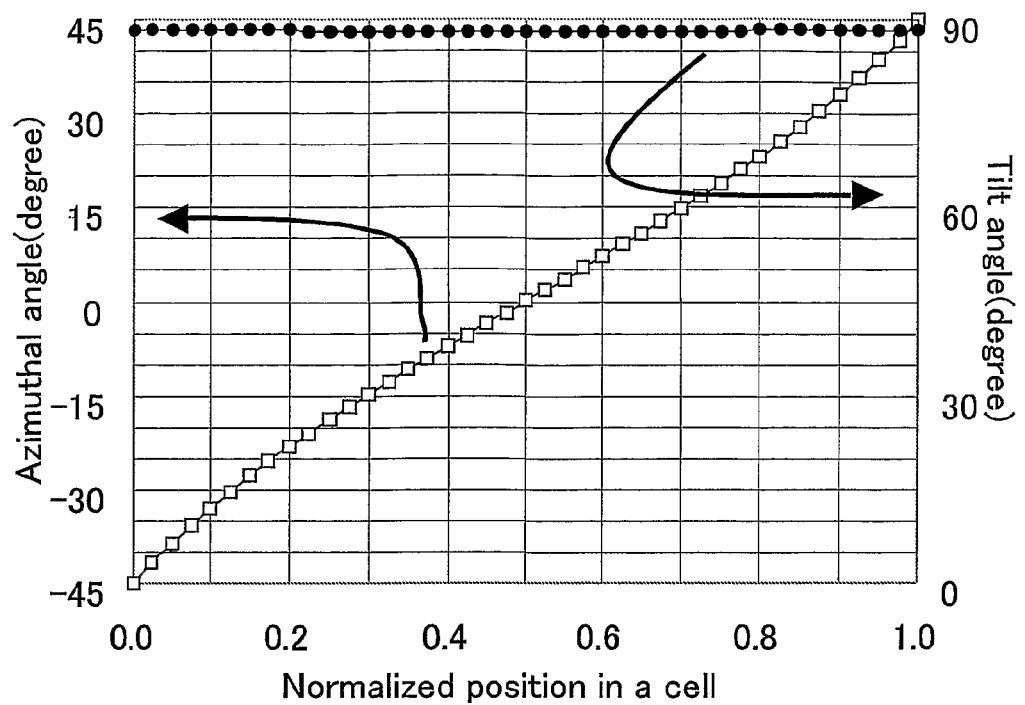
FIGS. 7A and 7B are graphs each showing tilt angles and azimuthal angles of liquid crystal molecules when a pretilt angle of the liquid crystal molecules near a first alignment film is 88.5 degrees and the pretilt angle of the liquid crystal molecules near a second alignment film is 88.5 degrees in a liquid crystal display device in VATN mode.
Figure 7B:
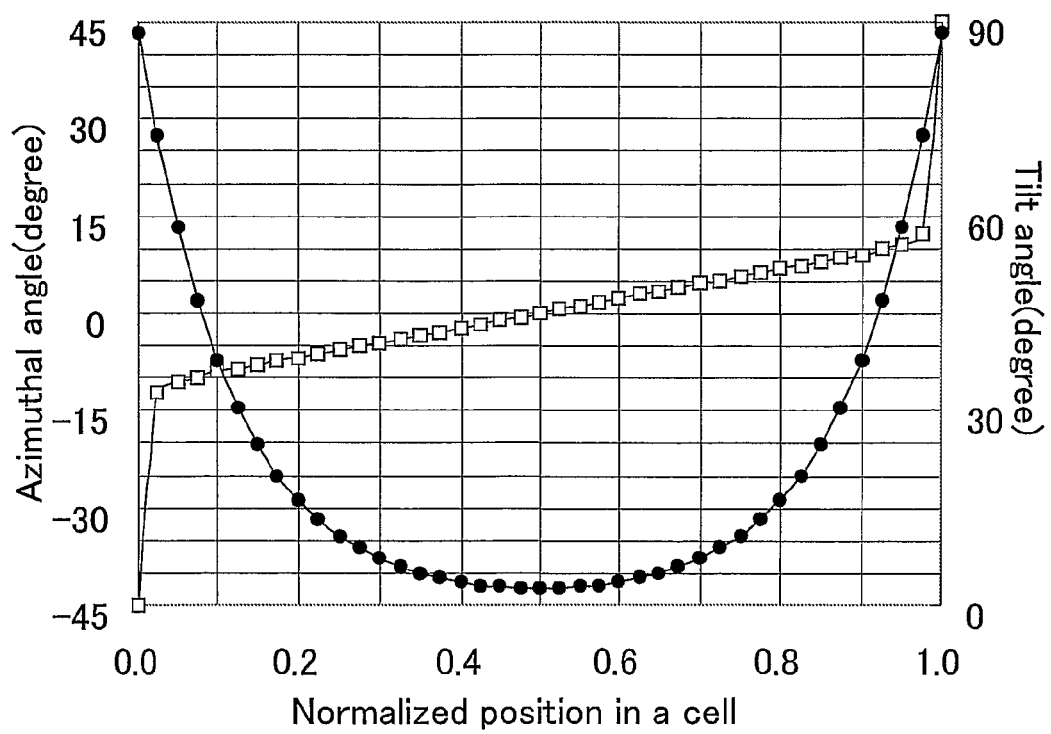

FIGS. 7A and 7B are graphs each showing tilt angles and azimuthal angles of liquid crystal molecules when a pretilt angle of the liquid crystal molecules near a first alignment film is 88.5 degrees and the pretilt angle of the liquid crystal molecules near a second alignment film is 88.5 degrees in a liquid crystal display device in VATN mode. FIG. 7A shows OFF-state, and FIG. 7B shows ON-state. As shown in FIG. 7A, the liquid crystal molecule has a constant tilt angle (tilt angle of the liquid crystal molecule to the substrate surface) of 88.5 degrees, and an azimuthal angle of the liquid crystal molecule changes at a constant rate from −45 degrees to +45 degrees, from the first substrate toward the second substrate, at OFF state when a voltage applied between the substrates interposing the liquid crystal layer is less than a threshold voltage. On the other hand, as shown in FIG. 7B, at ON state when a voltage more than a threshold voltage is applied between the substrates interposing the liquid crystal layer, the liquid crystal molecules near the first and second alignment films have tilt angles substantially vertical to the alignment films due to the alignment films, but the liquid crystal molecules at the center far from the alignment films have tilt angles substantially parallel to the alignment films due to the voltage applied to the liquid crystal layer. At this time, the azimuthal angles of the liquid crystal molecules near the first and second alignment films largely change at almost the same rate. And the azimuthal angle of the liquid crystal molecules at the center far from the alignment films shows a small change at a constant rate from the first substrate toward the second substrate. This is because that a twisting of the liquid crystal molecules near the first and second alignment films makes it possible to change the azimuthal angle at an energy smaller than that at the center far from the alignment films, because of the substantially vertical alignment maintained near the first and second alignment films. And the changes of the azimuthal angle (twist of the liquid crystal molecules) on the first substrate side and that on the second substrate side are symmetric because the pretilt angles near the first and second alignment films are equal. Therefore, high transmittance can be provided.

Figure 8A:
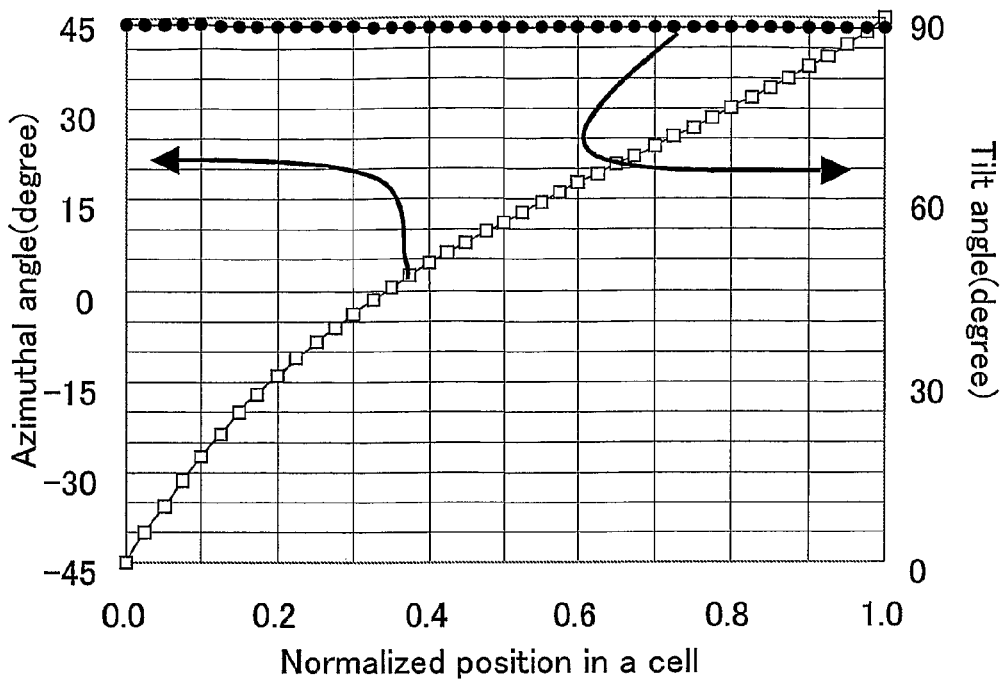
FIGS. 8A and 8B are graphs showing tilt angles and azimuthal angles of liquid crystal molecules when a pretilt angle of the liquid crystal molecules near a first alignment film is 89.0 degrees and a pretilt angle of the liquid crystal molecules near a second alignment film is 88.5 degrees in a liquid crystal display device in VATN mode.
Figure 8B:
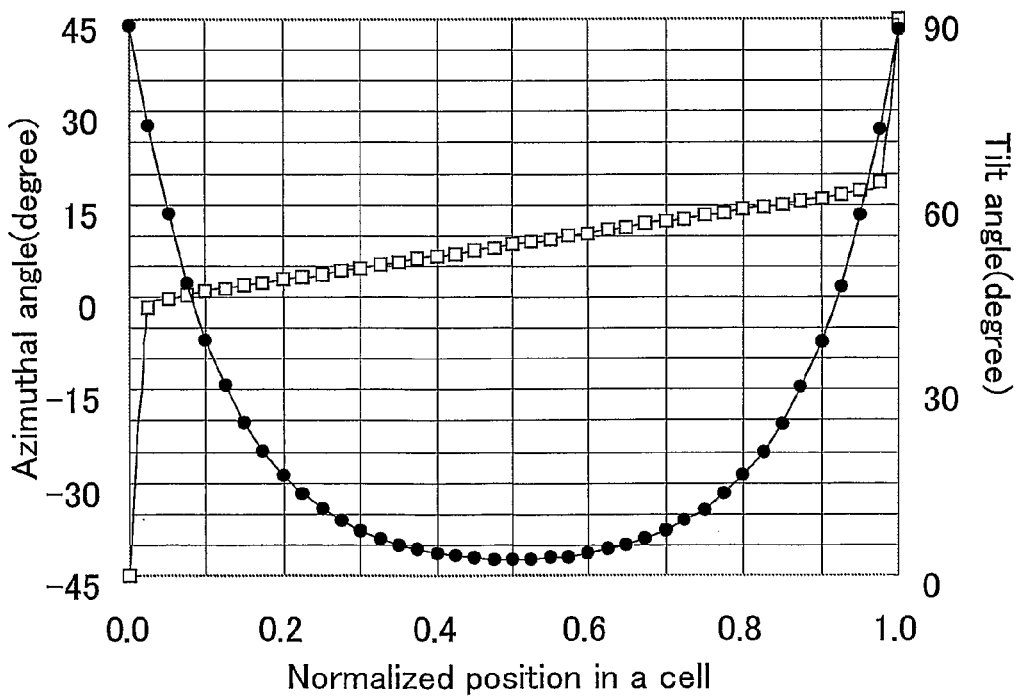

FIGS. 8A and 8B are graphs showing tilt angles and azimuthal angles of liquid crystal molecules when a pretilt angle of the liquid crystal molecules near a first alignment film is 89.0 degrees and a pretilt angle of the liquid crystal molecules near a second alignment film is 88.5 degrees in a liquid crystal display device in VATN mode. FIG. 8A shows OFF-state, and FIG. 8B shows ON-state. FIGS. 9A and 9B are graphs showing alignment directions of liquid crystal molecules when a pretilt angle of the liquid crystal molecules near a first alignment film is 89.5 degrees and a pretilt angle of the liquid crystal molecules near a second alignment film is 88.5 degrees in a liquid crystal display device in VATN mode. FIG. 9A shows OFF-state, and FIG. 9B shows ON-state. As shown in FIGS. 8A and 9A, a tilt angle of the liquid crystal molecules changes from the first substrate toward the second substrate at an almost constant rate from 89.0 degrees (FIG. 8A) or 89.5 degrees (FIG. 9A) to 88.5 degrees at OFF state. And an azimuthal angle of the liquid crystal molecules changes from −45 degrees to +45 degrees, from the first substrate toward the second substrate, slightly largely on the first substrate side.

On the other hand, as shown in FIGS. 8B and 9B, the liquid crystal molecules near the first and second alignment films have tilt angles substantially vertical to the alignment films due to the alignment films, but the liquid crystal molecules at the center far from the alignment films have tilt angles substantially parallel to the alignment films due to the voltage applied to the liquid crystal layer at ON state. At this time, the azimuthal angle of the liquid crystal molecules near the first alignment film having a larger tilt angle changes at a rate larger than that near the second alignment film. As mentioned above, the changes of the azimuthal angle (twist of the liquid crystal molecules) on the first substrate side and that on the second substrate side are not symmetric when the pretilt angles near the first and second alignment films are different. Therefore, the transmittance decreases.

Figure 10A:
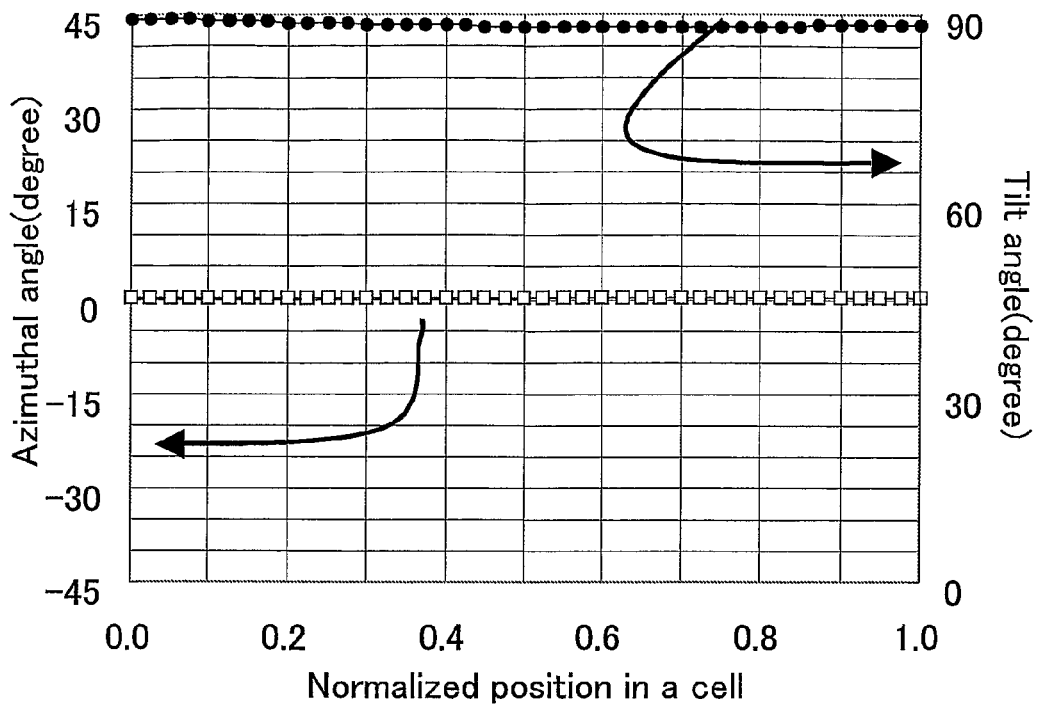
FIGS. 10A and 10B are graphs showing tilt angles and azimuthal angles of liquid crystal molecules when a pretilt angle of the liquid crystal molecules near a first alignment film is 89.5 degrees and a pretilt angle of the liquid crystal molecules near a second alignment film is 88.5 degrees in a liquid crystal display device in VAECB mode.
Figure 10B:
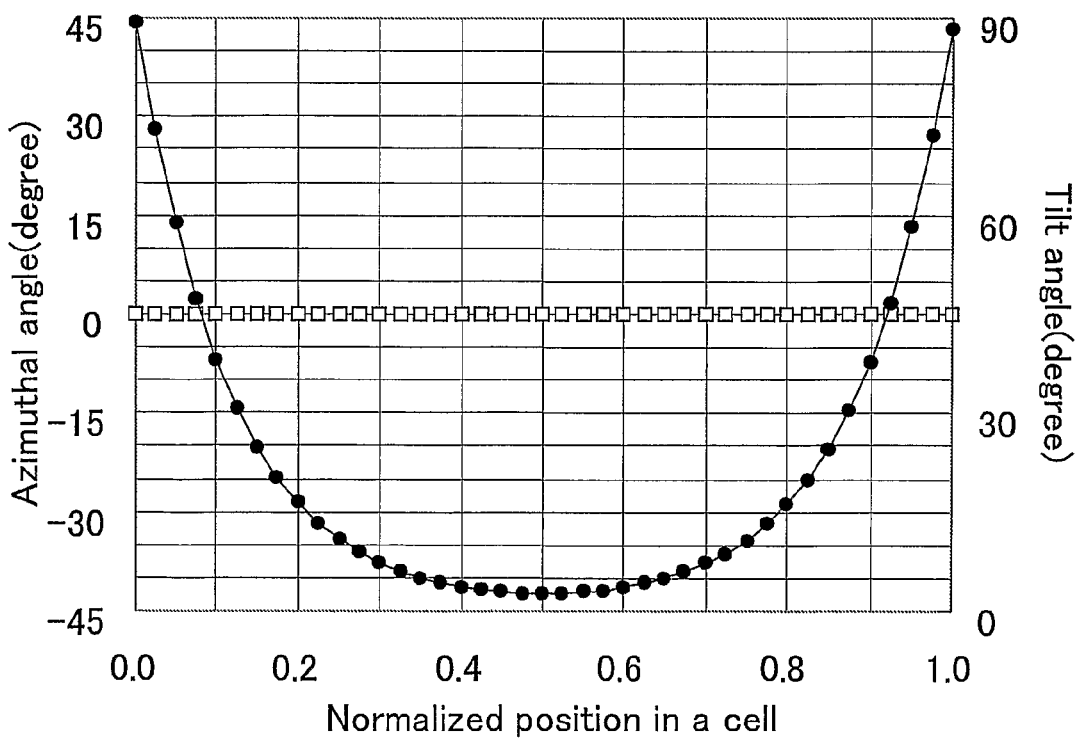
Figure 11A:
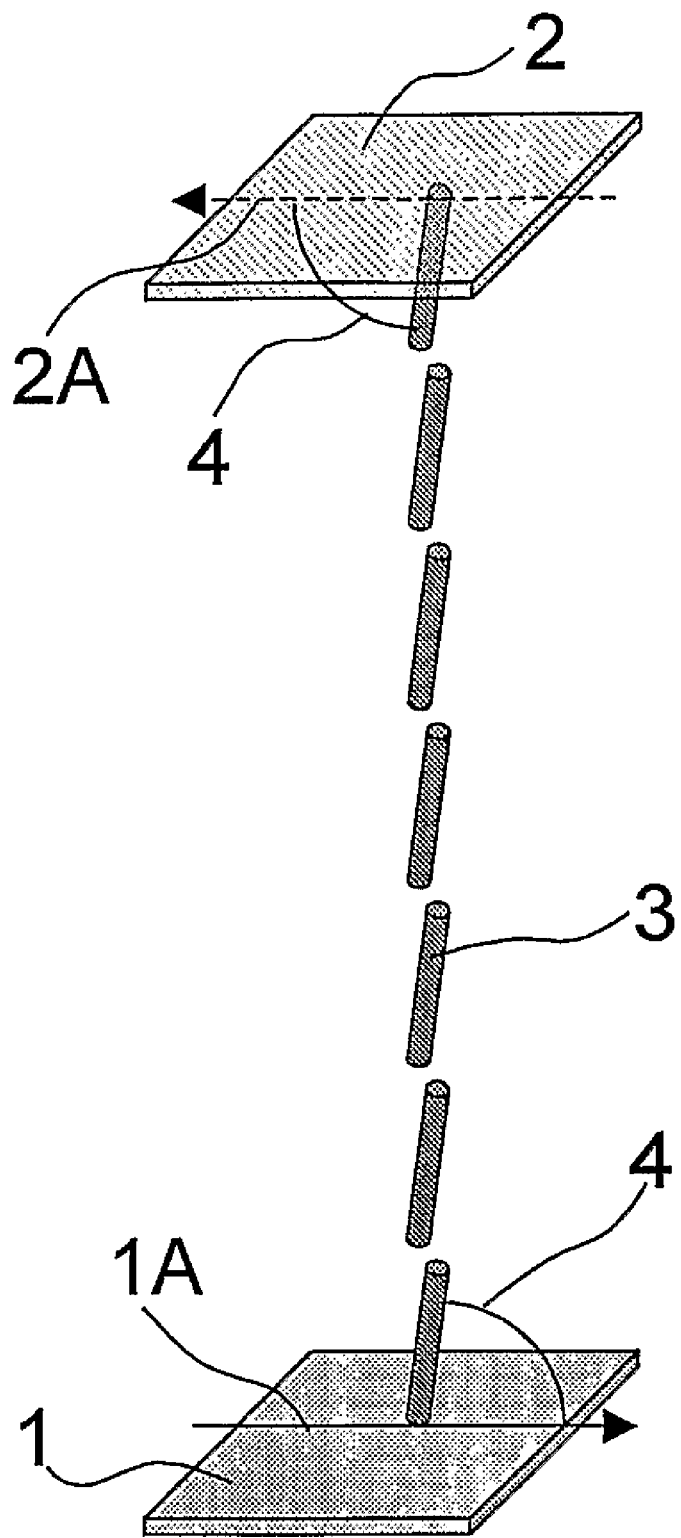
FIGS. 11A and 11B are conceptual views each showing a drive principle of a liquid crystal display device in VAECB mode.
Figure 11B:
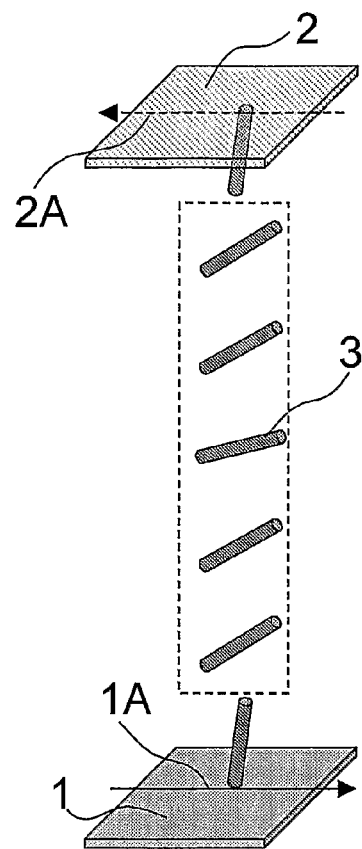

FIGS. 10A and 10B are graphs showing tilt angles and azimuthal angles of liquid crystal molecules when a pretilt angle of the liquid crystal molecules near a first alignment film is 89.5 degrees and a pretilt angle of the liquid crystal molecules near a second alignment film is 88.5 degrees in a liquid crystal display device in VAECB mode. FIG. 10A shows OFF-state, and FIG. 10B shows ON-state. As shown in FIG. 10A, the tilt angle of the liquid crystal molecule changes, from the first substrate toward the second substrate, at an almost constant rate from 89.5 degrees to 88.5 degrees at OFF state. On the other hand, as shown in FIG. 10B, the liquid crystal molecules near the first and second alignment films have tilt angles substantially vertical to the alignment films due to the alignment films, but the liquid crystal molecules at the center far from the alignment films have tilt angles substantially parallel to the alignment films due to the voltage applied to the liquid crystal layer at ON state. The liquid crystal molecule has a constant azimuthal angle of 0 degree at ON and OFF state. Therefore, in VAECB mode, the difference in pretilt angle between the liquid crystal molecules near the first alignment film and the liquid crystal molecules near the second alignment film basically does not change the behavior of the liquid crystal molecules. Therefore, the transmittance hardly changes as shown in FIG. 6.

The above results show that the suppression of the variation in pretilt angle makes it possible to provide a stable transmittance (excellent uniformity in brightness) in VATN mode. This effect can be exhibited exactly for modes such as VATN mode in which liquid crystal molecules align vertically while forming a twist structure. No problem of decrease in transmittance due to variation in pretilt angle occurs in modes such as TN and STN mode in which liquid crystal molecules align horizontally while forming a twist structure. That is, suppression of the variation in pretilt angle has no influence on the transmittance and leads to no improvement in display brightness characteristic in TN mode, STN mode, and the like. This is because light is transmitted while liquid crystal molecules horizontally align at OFF-state, and during this state, variation in pretilt angle has hardly influence on change in azimuthal angles (twist of the liquid molecules) in TN and STN mode. Therefore, uniformization of the pretilt angle is of great significance exactly in VATN mode. The great characteristic of the present invention is that uniformization of the pretilt angle makes it possible to provide a stable transmittance and an excellent display brightness characteristic in VATN mode.

The present application claims priority under the Paris Convention and the domestic law in the country to be entered into national phase on Patent Application No. 2005-141846 filed in Japan on May 13, 2005, and International Patent Application No. 2006-309438 filed in Japan Patent Office on May 1, 2006, the entire contents of which are hereby incorporated by reference.

The invention claimed is:

1. A liquid crystal display device comprising:
a first substrate, a second substrate, a liquid crystal layer provided between the substrates, a first alignment film provided on the liquid crystal layer side surface of the first substrate, and a second alignment film provided on the liquid crystal layer side surface of the second substrate,
wherein the liquid crystal layer includes liquid crystal molecules with negative dielectric anisotropy,
the first alignment film and the second alignment film align the liquid crystal molecules substantially vertically to the alignment film surfaces and,
the first alignment film and the second alignment film align the liquid crystal molecules near the first alignment film and the second alignment film such that alignment directions of the liquid crystal molecules near the first alignment film and alignment direction of the liquid crystal molecules near the second alignment film are perpendicular to each other, and the liquid crystal molecules form a twist structure between the first and the second substrates,
the first alignment film and the second alignment film are photo-alignment films made of a material having a photosensitive group,
an alignment direction of the first alignment film is substantially parallel to an absorption axis of a first polarizer on the first substrate, and
an alignment direction of the second alignment film is substantially parallel to an absorption axis of a second polarizer on the second substrate.

2. The liquid crystal display device according to claim 1, wherein the photo-alignment films provide the liquid crystal molecules near the first alignment film and the second alignment films with substantially uniform pretilt angles.

3. The liquid crystal display device according to claim 1, wherein the pretilt angles of the liquid crystal molecules near the first alignment film and the second alignment film are 89 degrees or less.

4. The liquid crystal display device according to claim 1, wherein the first alignment film and/or the second alignment film are/is photo-alignment films/a photo-alignment film made of a material having at least one photosensitive group selected from the group consisting of a 4-chalcone group, a 4'-chalcone group, a coumarin group, and a cinnamoyl group.

5. The liquid crystal display device according to claim 1, wherein each of the first alignment film and the second alignment film has two or more regions in one pixel, and among the two or more regions, an alignment direction is different.

6. A liquid crystal display device comprising:
a first substrate, a second substrate, a liquid crystal layer provided between the substrates, a first alignment film provided on the liquid crystal layer side surface of the first substrate, and a second alignment film provided on the liquid crystal layer side surface of the second substrate,
wherein the liquid crystal layer includes liquid crystal molecules with negative dielectric anisotropy,
the first alignment film and the second alignment film align the liquid crystal molecules substantially vertically to the alignment film surfaces and,
the first alignment film and the second alignment film align the liquid crystal molecules near the first alignment film and the second alignment film such that alignment direction of the liquid crystal molecules near the first alignment film and alignment direction of the liquid crystal molecules near the second alignment film are perpendicular to each other, so that the liquid crystal molecules form a twist structure between the first and the second substrates,
a difference in pretilt angles between the liquid crystal molecules near the first alignment film and the liquid crystal molecules near the second alignment film is less than 1.0 degree,
an alignment direction of the first alignment film is substantially parallel to an absorption axis of a first polarizer on the first substrate, and
an alignment direction of the second alignment film is substantially parallel to an absorption axis of a second polarizer on the second substrate.

7. The liquid crystal display device according to claim 6, wherein the pretilt angles of the liquid crystal molecules near the first alignment film and the second alignment film are 89 degrees or less.

8. The liquid crystal display device according to claim 6, wherein the first alignment film and/or the second alignment film are/is photo-alignment films/a photo-alignment film made of a material having at least one photosensitive group selected from the group consisting of a 4-chalcone group, a 4'-chalcone group, a coumarin group, and a cinnamoyl group.

9. The liquid crystal display device according to claim 6, wherein each of the first alignment film and the second alignment film has two or more regions in one pixel, and among the two or more regions, an alignment direction is different.

10. A liquid crystal display device comprising:
a first substrate, a second substrate, a liquid crystal layer provided between the substrates, a first alignment film provided on the liquid crystal layer side surface of the first substrate, and a second alignment film provided on the liquid crystal layer side surface of the second substrate,
wherein the liquid crystal layer includes liquid crystal molecules with negative dielectric anisotropy,
the first alignment film and the second alignment film align the liquid crystal molecules substantially vertically to the alignment film surfaces and,
the first alignment film and the second alignment film align the liquid crystal molecules near the first alignment film and the second alignment film such that alignment direction of the liquid crystal molecules near the first alignment film and alignment direction of the liquid crystal molecules near the second alignment film are perpendicular to each other, whereby the liquid crystal molecules form a twist structure between the first and the second substrates,
the first alignment film and the second alignment are photo-alignment films made of a material having a photosensitive group,
each of the first alignment film and the second alignment film has at least one structure selected from the group consisting of a bond-structure, a photoisomerization structure, and a photo-realignment structure of the photosensitive group,
an alignment direction of the first alignment film is substantially parallel to an absorption axis of a first polarizer on the first substrate, and
an alignment direction of the second alignment film is substantially parallel to an absorption axis of a second polarizer on the second substrate.

11. The liquid crystal display device according to claim 10, where the photo-alignment films provide the liquid crystal molecules near the first alignment film and the second alignment films with substantially uniform pretilt angles.

12. The liquid crystal display device according to claim 10, wherein the pretilt angles of the liquid crystal molecules near the first alignment film and the second alignment film are 89 degrees or less.

13. The liquid crystal display device according to claim 10, wherein the first alignment film and/or the second alignment film are/is photo-alignment films/a photo-alignment film made of a material having at least one photosensitive group selected from the group consisting of a 4-chalcone group, a 4'-chalcone group, a coumarin group, and a cinnamoyl group.

14. The liquid crystal display device according to claim 10, wherein each of the first alignment film and the second alignment film has two or more regions in one pixel, and among the two or more regions, an alignment direction is different.

15. A liquid crystal display device comprising:
a first substrate, a second substrate, a liquid crystal layer provided between the substrates, a first alignment film provided on the liquid crystal layer side surface of the first substrate, and a second alignment film provided on the liquid crystal layer side surface of the second substrate,
wherein the liquid crystal layer includes liquid crystal molecules with negative dielectric anisotropy,
the first alignment film and the second alignment film align the liquid crystal molecules substantially vertically to the alignment film surfaces and,
the first alignment film and the second alignment film align the liquid crystal molecules near the first alignment film and the second alignment film such that alignment directions of the liquid crystal molecules near the first alignment film and alignment direction of the liquid crystal molecules near the second alignment film are perpendicular to each other, so that the liquid crystal molecules form a twist structure between the first and the second substrates,
each of the first alignment film and the second alignment film has at least one structure selected from the group consisting of a bond-structure, a photoisomerization structure, and a photo-realignment structure of a photosensitive group,
a difference in pretilt angles between the liquid crystal molecules near the first alignment film and the liquid crystal molecules near the second alignment film is less than 1.0 degree,
an alignment direction of the first alignment film is substantially parallel to an absorption axis of a first polarizer on the first substrate, and
an alignment direction of the second alignment film is substantially parallel to an absorption axis of a second polarizer on the second substrate.

16. The liquid crystal display device according to claim 15, wherein the pretilt angles of the liquid crystal molecules near the first alignment film and the second alignment film are 89 degrees or less.

17. The liquid crystal display device according to claim 15, wherein the first alignment film and/or the second alignment film are/is photo-alignment films/a photo-alignment film made of a material having at least one photosensitive group selected from the group consisting of a 4-chalcone group, a 4'-chalone group, a coumarin group, and a cinnamoyl group.

18. The liquid crystal display device according to claim 15, wherein each of the first alignment film and the second alignment film has two or more regions in one pixel, and among the two or more regions, an alignment direction is different.

19. The liquid crystal display device according to claim 1, wherein the liquid crystal display device includes at least four domain regions having different twist directions of liquid crystal molecules in each pixel region.

20. The liquid crystal display device according to claim 6, wherein the liquid crystal display device includes at least four domain regions having different twist directions of liquid crystal molecules in each pixel region.

21. The liquid crystal display device according to claim 10, wherein the liquid crystal display device includes at least four domain regions having different twist directions of liquid crystal molecules in each pixel region.

22. The liquid crystal display device according to claim 15, wherein the liquid crystal display device includes at least four domain regions having different twist directions of liquid crystal molecules in each pixel region.

23. The liquid crystal display device according to claim 1, wherein each of the first alignment film and the second alignment film include the photosensitive group contained in the material having the photosensitive group as it is and a bond-structure of the photosensitive group.

24. The liquid crystal display device according to claim 6, wherein each of the first alignment film and the second alignment film include a photosensitive group contained in a photosensitive material and a bond-structure of the photosensitive group.

25. The liquid crystal display device according to claim 10, wherein each of the first alignment film and the second alignment film include the photosensitive group contained in the material having the photosensitive group and the bond-structure of the photosensitive group.

26. The liquid crystal display device according to claim 15, wherein each of the first alignment film and the second alignment film include a photosensitive group contained in a photosensitive material and the bond-structure of the photosensitive group.

27. The liquid crystal display device according to claim 1, wherein each of the first alignment film and the second alignment film is formed by irradiation of p-polarized light.

28. The liquid crystal display device according to claim 6, wherein each of the first alignment film and the second alignment film is formed by irradiation of p-polarized light.

29. The liquid crystal display device according to claim 10, wherein each of the first alignment film and the second alignment film is formed by irradiation of p-polarized light.

30. The liquid crystal display device according to claim 15, wherein each of the first alignment film and the second alignment film is formed by irradiation of p-polarized light.

* * * * *